United States Patent [19]

Steckly

[11] Patent Number: 4,991,384

[45] Date of Patent: Feb. 12, 1991

[54] GRASS SWEEPER

[76] Inventor: Graham Steckly, R.R. #2, Carstairs, Alberta, Canada, T0M 0N0

[21] Appl. No.: 448,342

[22] Filed: Dec. 11, 1989

[51] Int. Cl.⁵ .................... A01D 35/22; A01D 61/00
[52] U.S. Cl. ........................................ 56/202; 56/203
[58] Field of Search ............... 56/10.6, 10.7, 13.5, 56/14.3, 202–205, 400.02; 15/79 R, 79 A, 82, 83

[56] References Cited

U.S. PATENT DOCUMENTS

| 2,749,564 | 6/1956 | Tally | 15/79 A X |
| 3,135,080 | 6/1964 | Christiansen | 56/203 |
| 3,493,987 | 2/1970 | Longnecker | 56/10.7 X |
| 3,597,786 | 8/1971 | Ruhl | 56/400.02 X |
| 3,908,221 | 9/1975 | Wolfe | 56/400.02 X |
| 4,217,747 | 8/1980 | Brown | 56/203 |
| 4,835,951 | 6/1989 | Walker | 56/202 |

FOREIGN PATENT DOCUMENTS 227508 12/1922 Canada .
878829 8/1971 Canada .
957463 11/1974 Canada .

Primary Examiner—Thuy M. Bui
Attorney, Agent, or Firm—George H. Dunsmuir

[57] ABSTRACT

A sweeper apparatus for sweeping grass cuttings from a lawn and depositing the cuttings in a pile includes a wheel carried frame for towing directly behind or offset with respect to a tractor type lawn mower, a drum mounted on the frame with an open top front end for receiving lawn cuttings, a rotary sweeper for sweeping lawn cuttings upwardly beneath a cowl into the drum, a lever pivotally connected to the frame for manual actuation to tension a belt/pulley system which causes the drum to rotate to a cuttings discharge position and to return to a cuttings receiving position, and a release device for deactivating the tilt mechanism, whereby the drum returns to the cuttings receiving position.

7 Claims, 6 Drawing Sheets

GRASS SWEEPER

BACKGROUND OF THE INVENTION

This invention relates to a sweeper apparatus, and in particular to an apparatus for sweeping grass cuttings from a lawn.

The usual practice when cutting the normal lawn is to either leave the cuttings on the lawn or to collect the cuttings in a bag for disposal. Large lawns are usually cut using a ride-on type lawn mower, e.g. a small tractor with a lawn mower attachement. Removal of the grass cuttings from the lawn can present a problem. On large lawns, raking is out of the question. A removable grass catcher of the type used on a manually operated lawn mower would require frequent emptying.

A solution to the above defined problem is to gather the cuttings into large piles, which can relatively quickly and easily be removed from the lawn. This is the approach taken by the present inventor. A search of the patent literature discloses that others have taken the same approach. In this connection, reference is made to Canadian Patents Nos. 227,508, which issued to E. E. Laberge on Dec. 26, 1922, 878,829, which issued to W. Snerchynski et al on Aug. 24, 1971 and 957,463, which issued to D. D. Dankel et al on Nov. 12, 1974, and U.S. Pat. Nos. 2,749,564, which issued to C. E. Tally on Jun. 12, 1956, 3,493,987, which issued to H. F. Longnecker on Feb. 10, 1970 and 3,597,786, which issued to W. F. Ruhl on Aug. 10, 1971.

The majority of the patented devices are relatively simple manually operated devices for pushing across a lawn to sweep lawn cuttings into a container. The remaining patents relate to devices which are either relatively complicated or ill adapted for use with ride-on lawn mowers of the type including a small tractor with a lawn mower attachment.

The object of the present invention is to provide a relatively simple lawn sweeper apparatus, which is easy to operate, and which permits the driver of the vehicle to remain seated while the apparatus is unloaded.

BRIEF SUMMARY OF THE INVENTION

Accordingly, the present invention relates to a sweeper apparatus for removing loose cuttings from a lawn and depositing the clippings in a single heap comprising frame means; wheel means carrying said frame means for movement along a lawn; tow bar means connected to said frame means for attaching the apparatus to a towing vehicle; drum means rotatably mounted on said frame means, said drum means having an open side for receiving lawn cuttings; sweeper means for sweeping cuttings from the ground into said drum means; tilting means for causing said drum means to rotate from a cuttings receiving position to a cuttings discharge position, in which substantially all of the cuttings are emptied from the drum means to form a heap on the ground during movement of the apparatus over the ground; and release means for deactivating said tilting means, whereby said drum means automatically returns to the cuttings receiving position.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENT(S)

Figure 1:
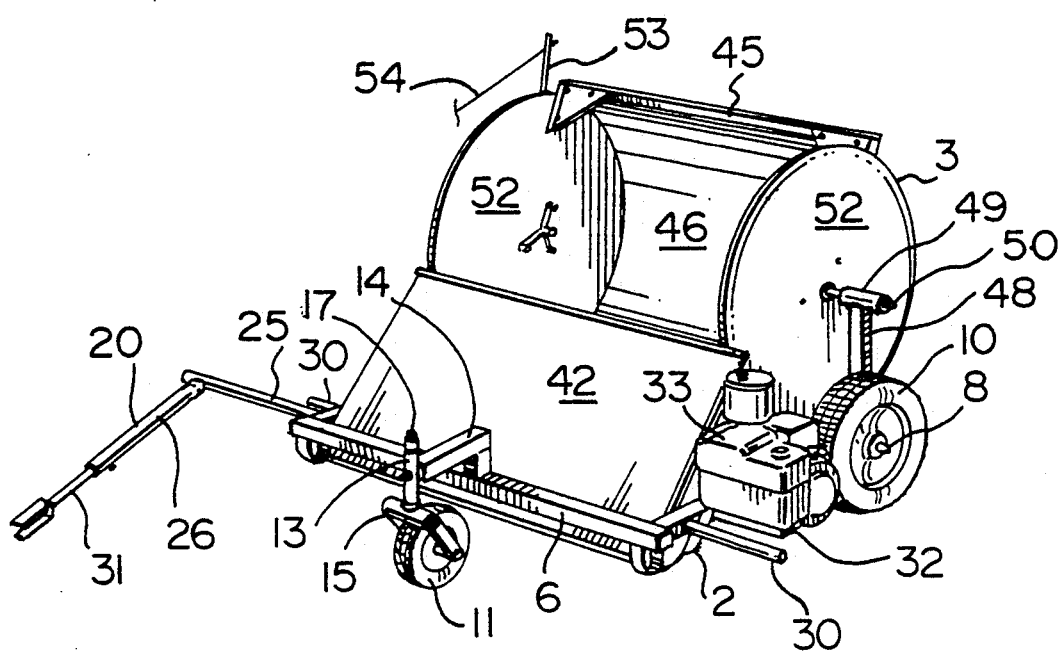
FIG. 1 is a perspective view from the front and one side of a sweeper apparatus in accordance with the present invention.

For the sake of simplicity, elements of the apparatus have been deleted from various figures of the drawings. It will be readily apparent during reading of the following specification.

With reference to the drawings, the basic elements of the sweeper apparatus of the present invention include a frame generally indicated at 1, a rotary brush 2 and a drum 3 mounted on the frame 1. The frame 1 is defined by a pair of generally L-shaped sides 5 and a front end 6 extending between the leading ends (in the direction of travel) of the sides 5. The sides 5 and the end 6 are formed of square cross section metal tubing. Stub axles 8 extend outwardly from the base 9 of each side 5 for carrying frame supporting wheel 11 pivotally mounted for rotation around a vertical axis in a sleeve 13 on the outer free end of an inverted L-shaped arm 14. The wheel 11 facilitates turning of the apparatus. The wheel is mounted between the arms of an inverted Y-shaped bracket 15, the stem of which is defined by a rod 17 extending through a bushing in the sleeve 13. The position of the rod 17 can be vertically adjusted in the sleeve 13 to change the height of the front end 6 of frame 1 above the ground.

Figure 2:
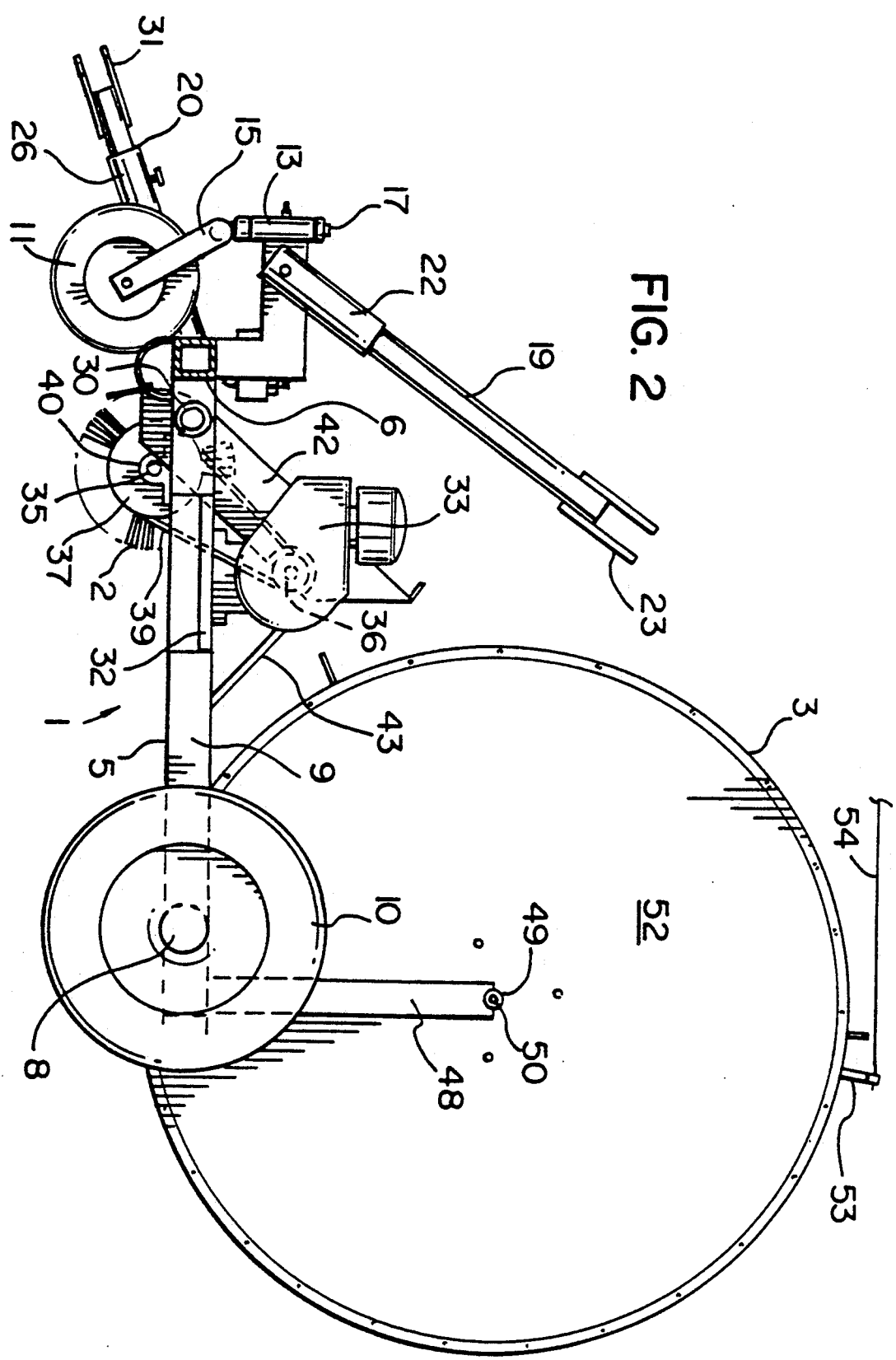
FIG. 2 is an elevation view of one side of the apparatus of FIG. 1.
Figure 3:
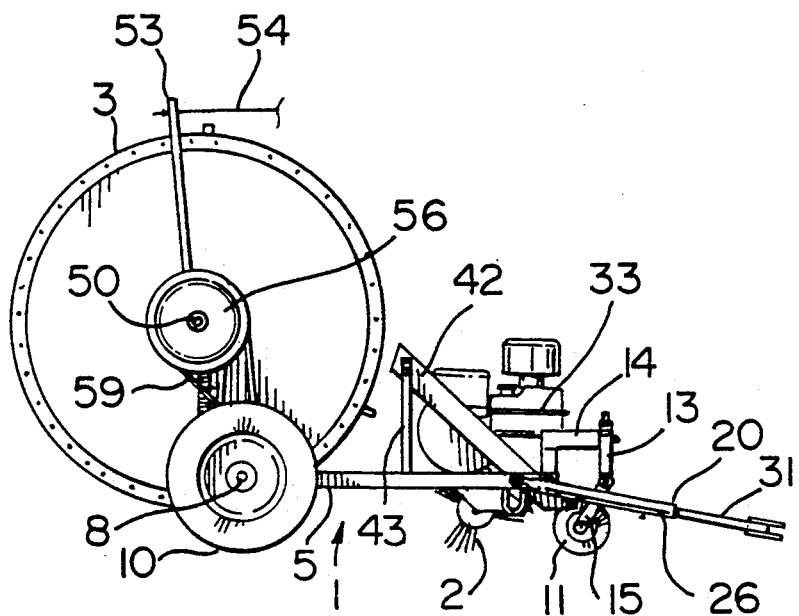
FIG. 3 is a elevation view of the other side of the apparatus of FIGS. 1 and 2.
Figure 4:
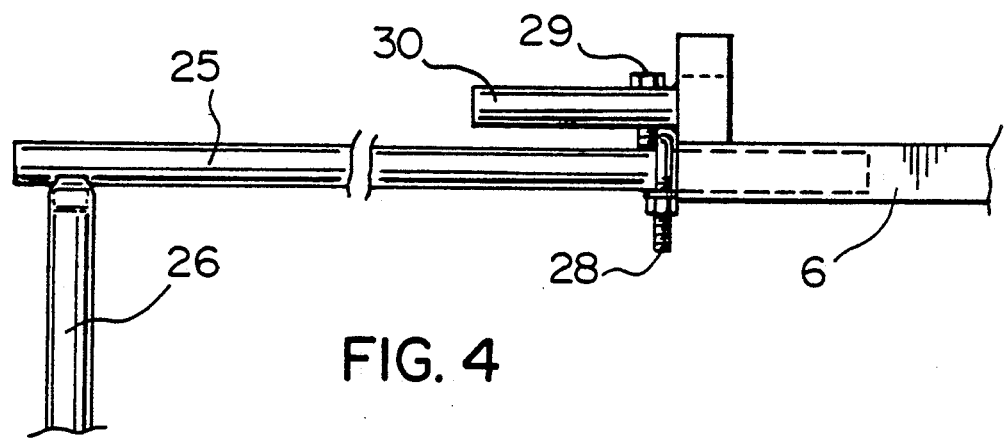
FIG. 4 is a plan view of a portion of a tow bar used in the apparatus of FIGS. 1 to 3.

The frame 1 is connected to a towing vehicle, e.g. a ride-on lawn mower (not shown) by one of a pair of tow bars 19 (FIG. 2) and 20 (FIGS. 1, 3 and 4). The tow bar 19 is pivotally connected to the arm 14 by a cotter pin (not shown) extending through a clevis 22 on one end of the bar. A clevis 23 is provided on the outer free end of the bar 19 for connecting the tow bar 19 to a vehicle when the apparatus is to be centered with respect to the towing vehicle, e.g. a rear discharged lawn mower.

The tow bar 20 is intended for use with a side discharge lawn mower, and includes a cylindrical length of tubing 25 slidable in either open end of the square cross section front end 6 of the frame 1, and a tubular arm 26 connected to and perpendicular to the tubing 25. The position of the tubing 25 in the frame end 6 is fixed by a U-bolt 28 (FIG. 4) on the tubing 25. With the tubing 25 in the desired position the U-bolt 28 is tightened on the tubing against the open end of the frame end 6. A bolt 29 extending through an arm 30 on the frame side 5 is tightened to sandwich the U-bolt 28 between the frame end 6 and the bolt 29. A hitch 31 extends out of the free end of the arm 26. The length of hitch arm combination can be adjusted by sliding the hitch 31 in the arm 26. A bolt is used to fix the position of the hitch 28 in the arm 26.

A plate 32 extends outwardly from one side 6 of the frame 1 for supporting a motor 33, which is connected to the shift 35 of the rotary brush 2 by pulleys 36 and 37, and a belt 39. On the motor side of the frame, the arm 30 protects the motor 33. The shaft 35 is suspended beneath the frame 1 by pillow block bearings 40 (one shown) on each side 6 of the frame. The brush 2 propels lawn cuttings against an inclined cowl 42 mounted on the frame 1. Arms 43 maintain the cowl 42 in an inclined position on the frame 1 for deflecting cuttings through an opening 45 in the cylindrical side wall 46 of the drum 3.

As best shown in FIG. 4, the drum 3 is rotatably mounted on the upper ends of posts 48 defining the vertical arms of the frame sides 6. A sleeve 49 is provided on each post 48 for receiving a shaft 50 extending outwardly from the center of the end wall 52 of the drum 3. The drum 3 is caused to rotate from the cuttings receiving position (FIG. 1) to a discharge position by a lever 53, the bottom end of which is pivotally connected to one side 6 of the frame 1 in front of the post 48. A rope 54 extends forwardly from the top end of the lever 53 to the towing vehicle so that the operator can pull the cord to initiate dumping. A pulley 56 on one of the drum shafts 50 is connected to a pulley 57 on one of the stub axles 8 carrying a frame supporting wheel 10 by a belt 59. The wheel 10 and the pulley 57 are mounted on a single sleeve 60, so that the pulley 57 rotates with the wheel 10 during movement of the apparatus above the ground. The belt 59 is normally loose, so that the belt and the pulley 56 do not move with the pulley 57.

The belt 59 is tensioned by a pulley 62 mounted on a pin 63 extending outwardly from a bracket 64 near the bottom end of the lever 53. Forward movement of the lever 53 causes the pulley 62 to tension the belt 59, whereby the pulleys 5 and 57, and consequently the drum 3 all rotate.

Figure 5:
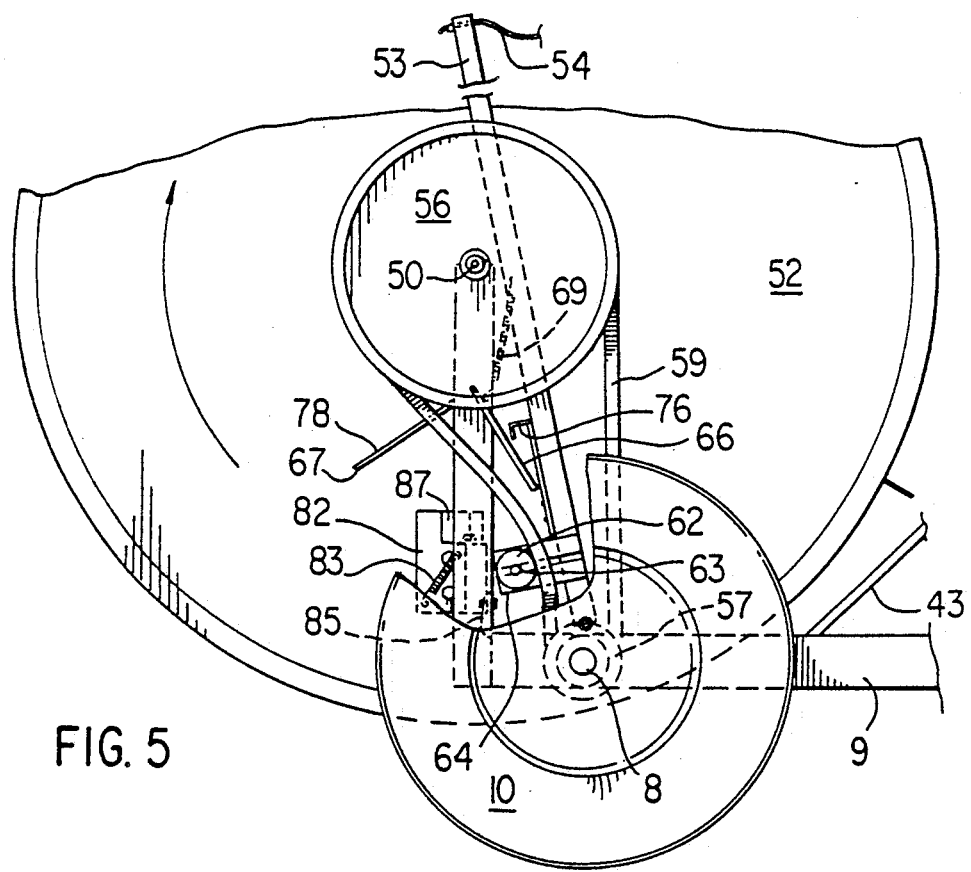
FIG. 5 is a partly sectioned elevation view of a portion of the side of the apparatus shown in FIG. 3 on a larger scale.
Figure 7:
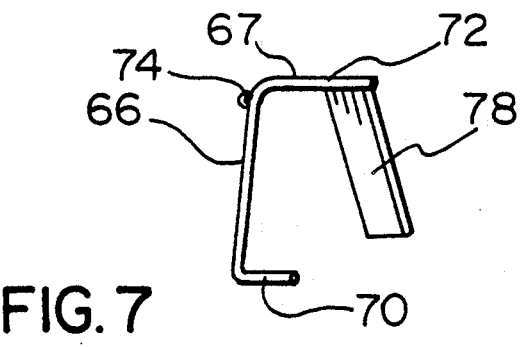
FIG. 7 is a perspective view of a latch used in the apparatus of FIGS. 1 to 3.
Figure 8:
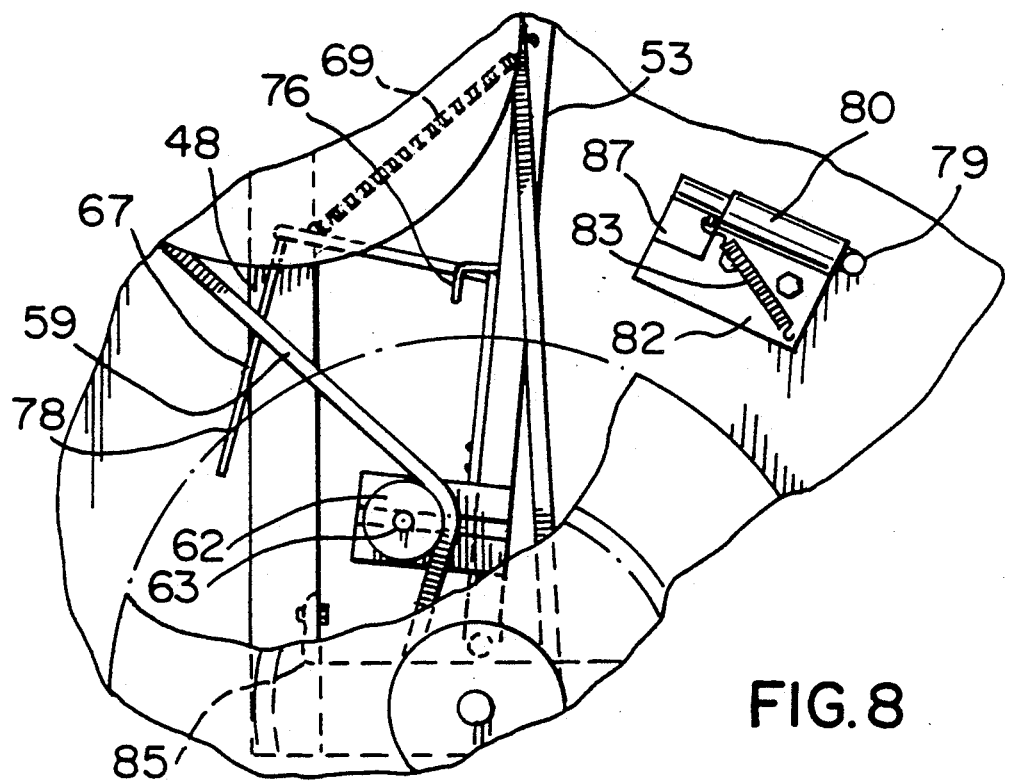
FIG. 8 is a partly sectioned side view similar to FIG. 5.
Figure 6:
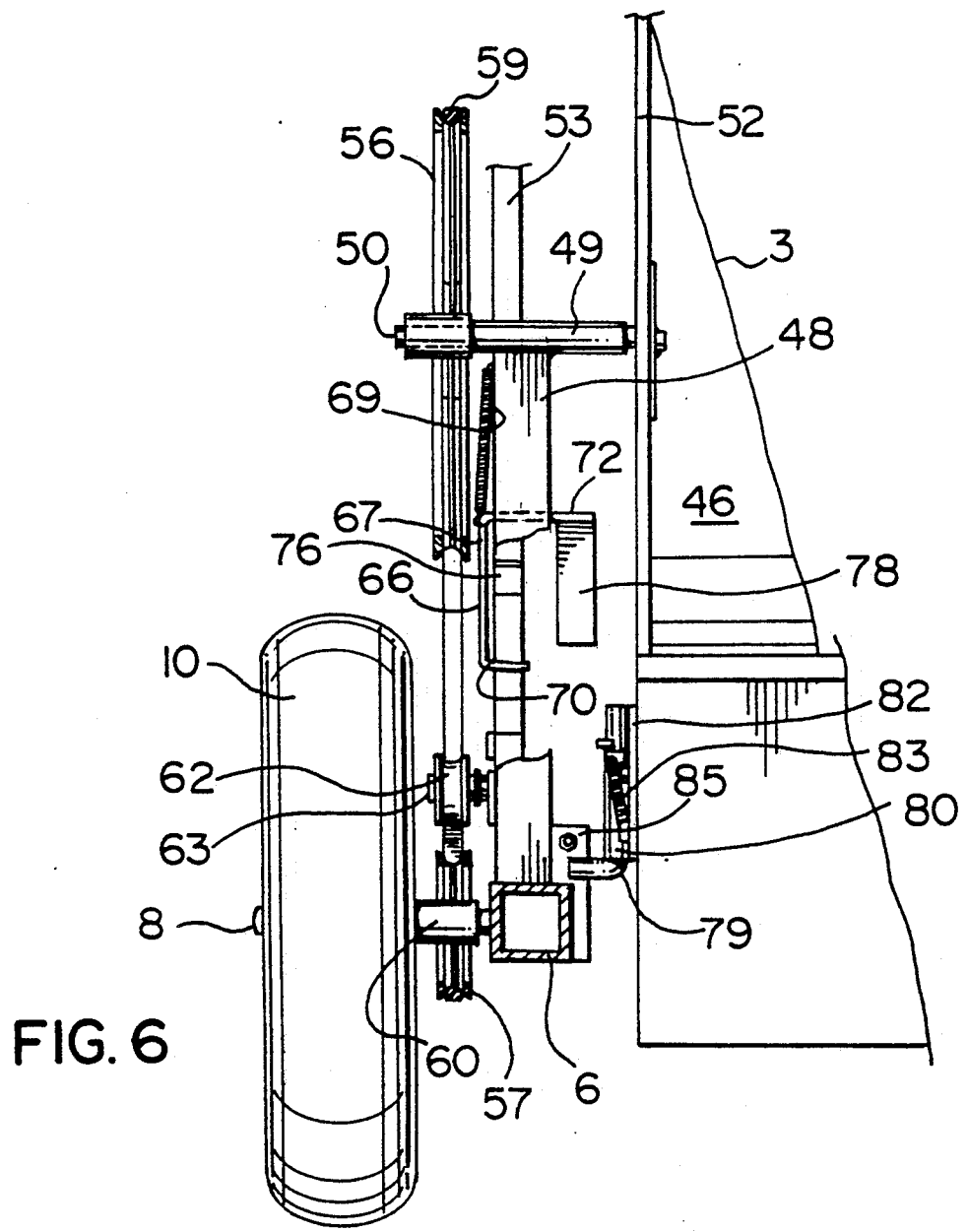
FIG. 6 is a partly sectioned end view of the side of the apparatus shown in FIG. 5.

The lever 53 is connected to the body 66 of a latch 67 by a helical spring 69. The latch 67, which is pivotally mounted in the post 48, maintains the belt 59 in the tensioned position, and also forms part of a release mechanism for returning the belt to the non-tensioned position. The body 66 of the latch is defined by a generally C-shaped rod with a short bottom arm 70 and a longer top arm 72, which extends through the post 48. A loop 74 is provided at the top corner of the latch 67 for attaching the spring 69 to the latch. With the drum 3 in the grass receiving position and the belt 59 loosened (FIG. 5), the hook defined by the arm 70 of the arm 66 of the latch 67 bears against and is slidable on a hook 76 on the rear surface of the lever 53. When the lever 53 is pulled forwardly, the spring 69 causes the latch 67 to rotate around the axis of the arm 72 so that the bottom arm 70 of the latch and hook 76 are coupled to maintain the belt 59 in a tensioned position. A strip 78 defining another arm of the latch 67 extends outwardly from the free end of the top arm 72 perpendicular to the rod 66 for engagement by a latch release. The latch release is defined by an L-shaped pin 79 rotatably mounted in a sleeve 80 on a plate 82. The plate 82 is bolted to the end wall 52 of the drum 3. The pin 79 is biased to a position flat against the end wall 52 by a helical spring 83. After the drum 3 has rotated approximately 357° from the cuttings receiving position, the pin 79 engages a rubber stop 85 on the post 48 to cause the pin to rotate, which causes a flag 87 to rotate with the pin 79. The flag 87 engages the strip 78 which causes the latch 67 to rotate around the axis of the arm 72. Thus, the arm 70 is disengaged from the hook 76, and the lever 53 returns to the rest position to release the tension of the pulley 62 on the belt 59. The pulley 57 continues to rotate with the wheel 10, but the pulley 56 and the drum 3 are free. The drum's centre of gravity causes the drum to rotate slightly in the reverse direction (counterclockwise in FIG. 5) until the pin 79 comes to rest against the rubber stop 85. The drum 3 is again in the cuttings receiving position.

Thus, there has been described a relatively simple grass sweeper apparatus. The use of a separate wheel driven pulley and belt mechanism for effecting dumping means that very little effort (other than pulling a cord) is required to effect dumping. Moreover, the drum automatically returns to the cuttings receiving position following dumping. The latch release merely ensures that drum rotation ceases when the drum reaches the cuttings receiving position. Finally, the use of an offset tow bar is ideal when using the apparatus with a side discharge lawn mower.

What is claim is:

1. A sweeper apparatus for removing loose cuttings from a lawn and depositing the clippings in a single heap comprising frame means; wheel means carrying said frame means for movement along a lawn; tow bar means connected to said frame means for attaching the apparatus to a towing vehicle; drum means rotatably mounted on said frame means, said drum means having an open side for receiving lawn cuttings; sweeper means for sweeping cuttings from the ground into said drum means; tilting means for causing said drum means to rotate from a cuttings receiving position to a cuttings discharge position, in which substantially all of the cuttings are emptied from the drum means to form a heap on the ground during movement of the apparatus over the ground; and release means for deactivating said tilting means, whereby said drum means automatically returns to the cuttings receiving position.

2. An apparatus according to claim 1, wherein said tow bar means includes a first tow bar offset longitudinally with respect to said frame means and drum means, whereby the apparatus can be attached to a side discharge lawnmower for picking up cuttings therefrom.

3. An apparatus according to claim 2, wherein said tow bar means includes a second tow bar in the center of said frame means for attaching the apparatus to a rear discharge lawnmower.

4. An apparatus according to claim 2, wherein said tilting means includes first pulley means on said drum means; second pulley means rotatable on said frame means and connected to said wheel means for rotation by said wheel means; and belt means extending around said first and second pulley means for rotating the drum means in response to movement of the apparatus.

5. An apparatus according to claim 4, including tightener means for tensioning said belt means on said first and second pulley means; and lever means for manually actuating said tightener means.

6. An apparatus according to claim 5, including latch means for releasably latching said lever means and tightener means in the belt tensioning position.

7. An apparatus according to claim 6, wherein said release means includes arm means on said drum means for engaging said latch means after approximately one revolution of said drum means from the cuttings receiving position to the discharge position for releasing said latch means, permitting said drum means to return to the cuttings receiving position.

* * * * *